US012574813B2

(12) United States Patent
Dalsgaard et al.

(10) Patent No.: US 12,574,813 B2
(45) Date of Patent: Mar. 10, 2026

(54) CONFIGURATION OF CARRIERS FOR NON-MOBILITY RELATED PURPOSES

(71) Applicant: Nokia Technologies Oy, Espoo (FI)

(72) Inventors: Lars Dalsgaard, Oulu (FI); Elena Virtej, Espoo (FI); Tero Henttonen, Espoo (FI); Jarkko Koskela, Oulu (FI); Niko Kolehmainen, Jorvas (FI)

(73) Assignee: Nokia Technologies Oy, Espoo (FI)

( * ) Notice: Subject to any disclaimer, the term of this patent is extended or adjusted under 35 U.S.C. 154(b) by 340 days.

(21) Appl. No.: 17/608,058

(22) PCT Filed: May 2, 2019

(86) PCT No.: PCT/US2019/030414
§ 371 (c)(1),
(2) Date: Nov. 1, 2021

(87) PCT Pub. No.: WO2020/222848
PCT Pub. Date: Nov. 5, 2020

(65) Prior Publication Data
US 2022/0232440 A1      Jul. 21, 2022

(51) Int. Cl.
*H04W 36/00*          (2009.01)
*H04W 36/32*          (2009.01)

(52) U.S. Cl.
CPC ...  *H04W 36/0061* (2013.01); *H04W 36/0058* (2018.08); *H04W 36/0083* (2013.01)

(58) Field of Classification Search
CPC ....... H04W 36/00837; H04W 36/0061; H04W 36/32; H04W 36/0058; H04W 36/0083;
(Continued)

(56) References Cited

U.S. PATENT DOCUMENTS

| 8,688,120 B2 * | 4/2014 | Song | H04W 36/08 |
| | | | 370/332 |
| 10,004,012 B2 * | 6/2018 | Kaikkonen | H04H 20/38 |

(Continued)

FOREIGN PATENT DOCUMENTS

| CN | 104205918 A | 12/2014 |
| CN | 104813711 A | 7/2015 |

(Continued)

OTHER PUBLICATIONS

Office Action received for corresponding Indian Patent Application No. 202147054968, dated Mar. 28, 2022, 6 pages.
(Continued)

*Primary Examiner* — Rasheed Gidado
(74) *Attorney, Agent, or Firm* — Brake Hughes Bellermann LLP

(57) ABSTRACT

A method, apparatus, and a computer-readable storage medium are provided for configuring carriers and/or performing reference signal measurements. In one example implementation, the method may include a user equipment (UE) receiving carrier configuration information and carrier type information from a network node, the carrier type information including an indication whether a carrier is an offloading carrier; determining whether one or more offloading conditions to perform offloading measurements are satisfied; and performing the offloading measurements in response to determining that the one or more offloading conditions are satisfied. In an additional example implementation, the method may include a network node transmitting carrier configuration information and carrier type information to a user equipment (UE) and receiving offloading and/or mobility measurements from the user equipment (UE), the off-loading and/or mobility measurements gener-
(Continued)

Receive, by a user equipment (UE), carrier configuration information and carrier type information from a network node, the carrier type information including an indication whether a carrier is an offloading carrier — 410

Determine, by the user equipment (UE), whether one or more offloading conditions to perform offloading measurements are satisfied — 420

Perform, by the user equipment (UE), the offloading measurements in response to determining that the one or more offloading conditions are satisfied — 430 ated at the user equipment (UE) based on the carrier configuration information and carrier type.

19 Claims, 6 Drawing Sheets

(58) Field of Classification Search
CPC . H04W 36/0094; H04W 36/04; H04W 36/22; H04W 24/10
See application file for complete search history.

(56) References Cited

U.S. PATENT DOCUMENTS

| | | | | |
|---|---|---|---|---|
| 11,949,608 | B2 * | 4/2024 | Bergqvist | H04W 24/10 |
| 2012/0100803 | A1 * | 4/2012 | Suumaki | H04W 12/03 |
| | | | | 455/41.1 |
| 2014/0241183 | A1 * | 8/2014 | Comeau | H04W 72/0453 |
| | | | | 370/252 |
| 2015/0341148 | A1 * | 11/2015 | Kazmi | H04W 72/1273 |
| | | | | 370/252 |
| 2016/0057684 | A1 * | 2/2016 | Larsson | H04W 36/26 |
| | | | | 370/331 |
| 2016/0205591 | A1 * | 7/2016 | Hong | H04W 40/02 |
| | | | | 370/235 |
| 2017/0006510 | A1 | 1/2017 | Kaikkonen et al. | |
| 2018/0014218 | A1 * | 1/2018 | Kubota | H04W 48/00 |
| 2018/0048413 | A1 | 2/2018 | Liu et al. | |
| 2018/0376456 | A1 * | 12/2018 | Tsutsui | H04L 5/0098 |
| 2019/0037425 | A1 * | 1/2019 | Hong | H04W 72/23 |
| 2019/0261234 | A1 * | 8/2019 | Park | H04W 36/085 |
| 2019/0306739 | A1 * | 10/2019 | Kim | H04W 72/0453 |
| 2020/0252823 | A1 * | 8/2020 | Kim | H04W 48/16 |
| 2020/0260311 | A1 * | 8/2020 | Jung | H04L 5/0048 |

FOREIGN PATENT DOCUMENTS

| | | |
|---|---|---|
| CN | 104813719 A | 7/2015 |
| CN | 106664634 A | 5/2017 |
| CN | 107667557 A | 2/2018 |
| CN | 108616317 A | 10/2018 |

OTHER PUBLICATIONS

"3rd Generation Partnership Project; Technical Specification Group Radio Access Network; Evolved Universal Terrestrial Radio Access (E-UTRA); Requirements for support of radio resource management (Release 16)", 3GPP TS 36.133, V16.1.0, Mar. 2019, 3585 pages.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331, V15.5.0, Mar. 2019, pp. 1-948.

"3rd Generation Partnership Project; Technical Specification Group Radio Access Network; NR; Radio Resource Control (RRC) protocol specification (Release 15)", 3GPP TS 38.331, V15.5.1, Apr. 2019, pp. 1-491.

"3rd Generation Partnership Project; Technical Specification Group Radio Access Network; NR; Base Station (BS) ElectroMagnetic Compatibility (EMC) (Release 15)", 3GPP TS 38.113, V15.5.0, Mar. 2019, pp. 1-31.

"3rd Generation Partnership Project; Technical Specification Group Radio Access Network; NR; Requirements for support of radio resource management (Release 15)", 3GPP TS 38.133, V15.5.0, Mar. 2019, 1232 pages.

"3rd Generation Partnership Project; Technical Specification Group Services and System Aspects; Study on Communication for Automation in Vertical Domains (Release 16)", 3GPP TR 22.804, V16.2.0, Dec. 2018, pp. 1-196.

International Search Report and Written Opinion received for corresponding Patent Cooperation Treaty Application No. PCT/US2019/030414, dated Jul. 8, 2019, 13 pages.

Communication pursuant to Article 94(3) EPC for European Application No. 19724037.7; mailed on Feb. 27, 2024, 4 pages.

Office Action for Chinese Application No. 201980098075.9, mailed on May 24, 2024, 10 pages.

Communication Pursuant to Article 94(3) EPC for European Patent Application No. 19724037.7, mailed on Jul. 15, 2024, 7 pages.

Office Action for Chinese Patent Application No. 201980098075.9, mailed on Mar. 28, 2025, 10 pages.

Office Action for Indonesia Patent Application No. P00202110872, mailed on Dec. 2, 2025, 6 pages.

Office Action for Chinese Patent Application No. 201980098075.9, mailed on Jan. 14, 2025, 11 pages.

* cited by examiner

Example Wireless Network 130

200

400

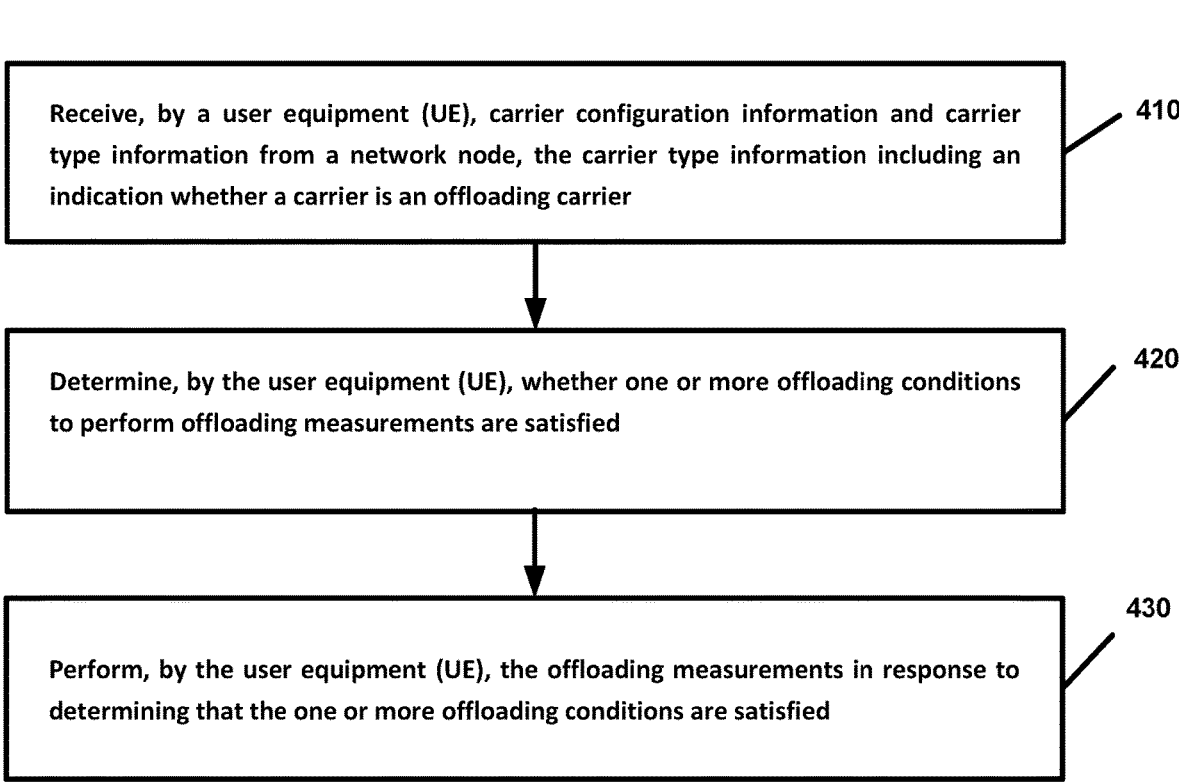

Receive, by a user equipment (UE), carrier configuration information and carrier type information from a network node, the carrier type information including an indication whether a carrier is an offloading carrier                    410

Determine, by the user equipment (UE), whether one or more offloading conditions to perform offloading measurements are satisfied                    420

Perform, by the user equipment (UE), the offloading measurements in response to determining that the one or more offloading conditions are satisfied                    430

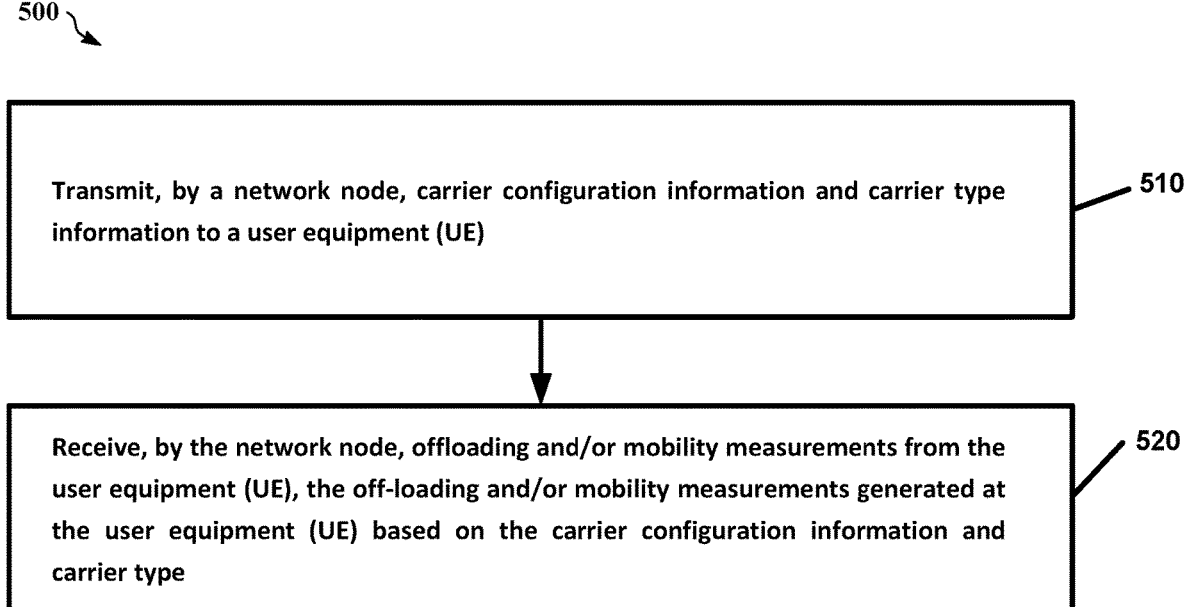

Transmit, by a network node, carrier configuration information and carrier type information to a user equipment (UE)    510

Receive, by the network node, offloading and/or mobility measurements from the user equipment (UE), the off-loading and/or mobility measurements generated at the user equipment (UE) based on the carrier configuration information and carrier type    520

FIG. 5

CONFIGURATION OF CARRIERS FOR NON-MOBILITY RELATED PURPOSES

RELATED APPLICATION

This application was originally filed as PCT Application No. PCT/US2019/030414, filed on May 2, 2019, of which is incorporated herein by reference in its entirety.

TECHNICAL FIELD

This description relates to wireless communications, and in particular, to configuration of carriers.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP or Evolved Node B (eNBs), provide wireless access within a coverage area or cell. In LTE, mobile devices, or mobile stations are referred to as user equipments (UE). LTE has included a number of improvements or developments.

5G New Radio (NR) development is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT), and may offer new types of mission-critical services. Ultra-reliable and low-latency communications (URLLC) devices may require high reliability and very low latency. In NR, base stations or access points (APs) are referred to as 5G Node B (gNBs) and mobile devices or mobile stations are referred to as user equipments (UE), just like in LTE.

SUMMARY

A method, apparatus, and a computer-readable storage medium are provided for configuring carriers and/or performing reference signal measurements.

In one example implementation, the method may include receiving, by a user equipment (UE), carrier configuration information and carrier type information from a network node, the carrier type information including an indication whether a carrier is an offloading carrier; determining, by the user equipment (UE), whether one or more offloading conditions to perform offloading measurements are satisfied; and performing, by the user equipment (UE), the offloading measurements in response to determining that the one or more offloading conditions are satisfied, the offloading measurements performed on the carrier when the carrier is an offloading carrier.

In an additional example implementation, the method may include transmitting, by a network node, carrier configuration information and carrier type information to a user equipment (UE); and receiving, by the network node, offloading and/or mobility measurements from the user equipment (UE), the off-loading and/or mobility measurements generated at the user equipment (UE) based on the carrier configuration information and carrier type.

BRIEF DESCRIPTION OF THE DRAWINGS

FIG. 4 is a flow chart illustrating carrier configuration and reference signal measurements, according to an example implementation.

FIG. 5 is a flow chart illustrating carrier configuration and reference signal measurements, according to an additional example implementation.

DETAILED DESCRIPTION

Figure 1:
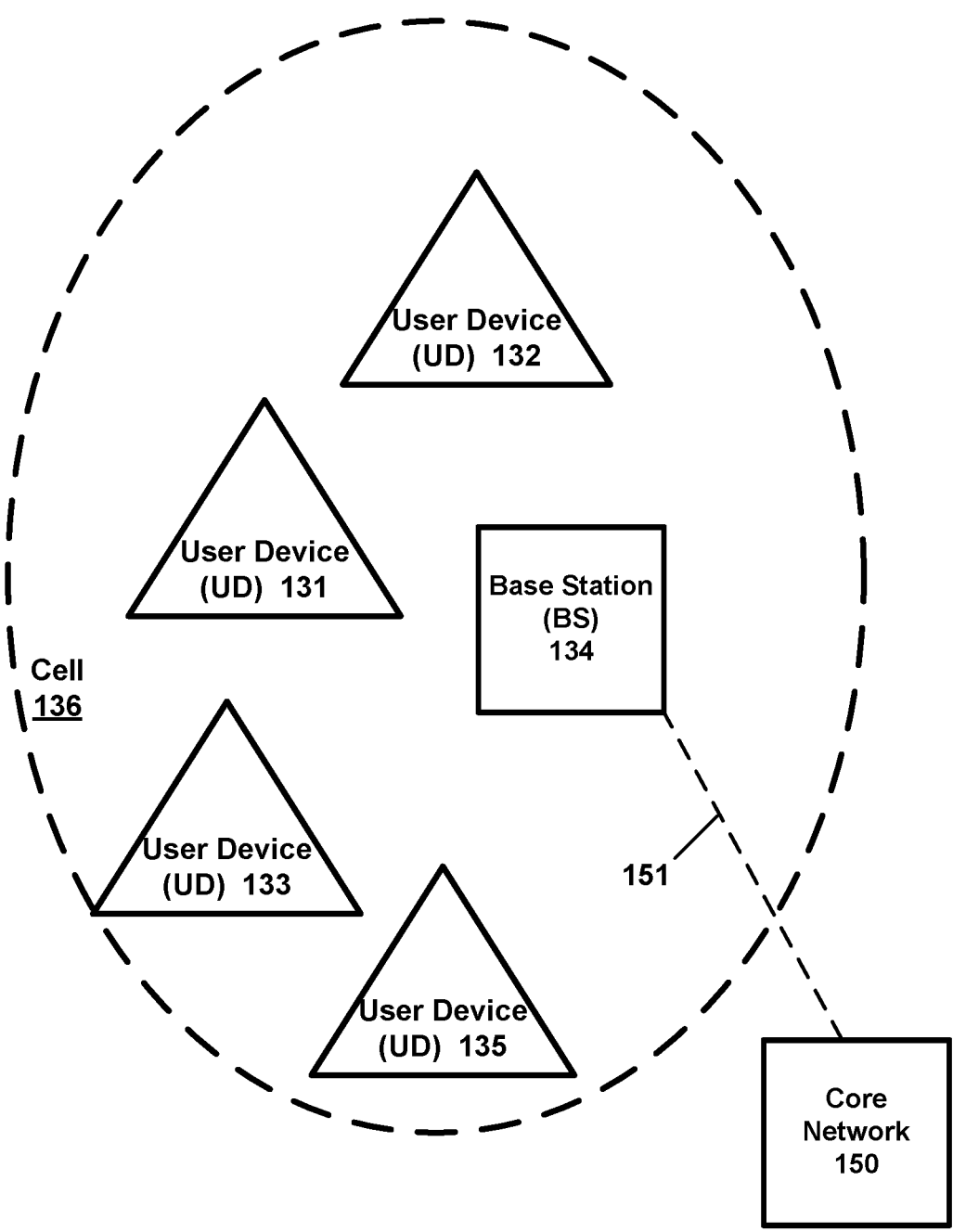
FIG. 1 is a block diagram of a wireless network according to an example implementation.

FIG. 1 is a block diagram of a wireless network 130 according to an example implementation. In the wireless network 130 of FIG. 1, user devices (UDs) 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a 5G Node B (gNB), or a network node. At least part of the functionalities of an access point (AP), base station (BS), (e)Node B (eNB), or 5G Node B (gNB) may also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples, or any other wireless device. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example implementations or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC).

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC or machine to machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing up to e.g., 1 ms U-Plane (user/data plane) latency connectivity with 1-1e-5 reliability, by way of an illustrative example. Thus, for example, URLLC user devices/UEs may require a significantly lower block error rate than other types of user devices/UEs as well as low latency. Thus, for example, a URLLC UE (or URLLC application on a UE) may require much shorter latency, as compared to a eMBB UE (or an eMBB application running on a UE).

The various example implementations may be applied to a wide variety of wireless technologies or wireless networks, such as LTE, LTE-A, LTE-A Pro, 5G, IoT, MTC, eMTC, eMBB, URLLC, etc., or any other wireless network or wireless technology. These example networks, technologies or data service types are provided only as illustrative examples.

Multiple Input, Multiple Output (MIMO) may refer to a technique for increasing the capacity of a radio link using multiple transmit and receive antennas to exploit multipath propagation. MIMO may include the use of multiple antennas at the transmitter and/or the receiver. MIMO may include a multi-dimensional approach that transmits and receives two or more unique data streams through one radio channel. For example, MIMO may refer to a technique for sending and receiving more than one data signal simultaneously over the same radio channel by exploiting multipath propagation. According to an illustrative example, multi-user multiple input, multiple output (multi-user MIMO, or MU-MIMO) enhances MIMO technology by allowing a base station (BS) or other wireless node to simultaneously transmit or receive multiple streams to different user devices or UEs, which may include simultaneously transmitting a first stream to a first UE, and a second stream to a second UE, via a same (or common or shared) set of physical resource blocks (PRBs) (e.g., where each PRB may include a set of time-frequency resources).

Also, a BS may use precoding to transmit data to a UE (based on a precoder matrix or precoder vector for the UE). For example, a UE may receive reference signals or pilot signals, and may determine a quantized version of a DL channel estimate, and then provide the BS with an indication of the quantized DL channel estimate. The BS may determine a precoder matrix based on the quantized channel estimate, where the precoder matrix may be used to focus or direct transmitted signal energy in the best channel direction for the UE. Also, each UE may use a decoder matrix may be determined, e.g., where the UE may receive reference signals from the BS, determine a channel estimate of the DL channel, and then determine a decoder matrix for the DL channel based on the DL channel estimate. For example, a precoder matrix may indicate antenna weights (e.g., an amplitude/gain and phase for each weight) to be applied to an antenna array of a transmitting wireless device. Likewise, a decoder matrix may indicate antenna weights (e.g., an amplitude/gain and phase for each weight) to be applied to an antenna array of a receiving wireless device. This applies to UL as well when a UE is transmitting data to a BS.

For example, according to an example aspect, a receiving wireless user device may determine a precoder matrix using Interference Rejection Combining (IRC) in which the user device may receive reference signals (or other signals) from a number of BSs (e.g., and may measure a signal strength, signal power, or other signal parameter for a signal received from each BS), and may generate a decoder matrix that may suppress or reduce signals from one or more interferers (or interfering cells or BSs), e.g., by providing a null (or very low antenna gain) in the direction of the interfering signal, in order to increase a signal-to interference plus noise ratio (SINR) of a desired signal. In order to reduce the overall interference from a number of different interferers, a receiver may use, for example, a Linear Minimum Mean Square Error Interference Rejection Combining (LMMSE-IRC) receiver to determine a decoding matrix. The IRC receiver and LMMSE-IRC receiver are merely examples, and other types of receivers or techniques may be used to determine a decoder matrix. After the decoder matrix has been determined, the receiving UE/user device may apply antenna weights (e.g., each antenna weight including amplitude and phase) to a plurality of antennas at the receiving UE or device based on the decoder matrix. Similarly, a precoder matrix may include antenna weights that may be applied to antennas of a transmitting wireless device or node. This applies to a receiving BS as well.

In 3GPP Rel-15 NR, packet data convergence protocol (PDCP) Duplication via New Radio (NR) Dual Connectivity (DC) is supported. However, there are limitations. For instance, a PDCP entity that duplicates PDCP protocol data units (PDUs) may support only two associated radio link control (RLC) protocol entities (also referred to as RLC entity, or RLC leg, or simply leg) which are associated at a physical layer with a component carrier, or a radio link/radio frequency (RF) link (which may be referred to as a radio leg or simply leg). One of the two RLC entities may be located in the same node, e.g., master node (MgNB), and the other RLC entity may be located in a secondary node (SgNB). The two nodes, e.g., MgNB and SgNB may be connected via an Xn interface. The Xn interface may include a user plane interface, e.g., Xn-U, for user data, and a control plane interface, e.g., Xn-C, for control data. In 3GPP Rel-16, PDCP duplication for more than two legs may be supported by combining dual connectivity (DC) and carrier aggregation (CA). In addition, multiple legs may be introduced via higher layer multi-connectivity.

The present disclosure applies to carrier aggregation, dual connectivity, or any form of multi-RAT dual connectivity/multi connectivity, or other form of carrier/bandwidth part aggregation. For example, the dual connectivity may be between NR and NR, and multi-connectivity could be between LTE, NR and WLAN, or between NR, NR, and NR (e.g., between three different NR carriers).

Applications (some applications, e.g., industrial applications) may be able to tolerate individual packet errors, but, may not be able to tolerate consecutive (e.g., subsequent, adjacent, sequential, etc.) packet errors due to the inherent limitations of the application. For instance, a communication system used in an industrial setting should not have packet errors resulting in exceeding survival time of the system which may also affect the reliability of the industrial application. Survival time, for example, may be defined as time (e.g., duration) an application may survive without receiving the expected packet(s) or the time that an application consuming a communication service may continue without an anticipated message. Additional details may be found in 3GPP TR 22.804.

However, when using mechanisms/procedures that use multiple legs (e.g., links), it is desirable to minimize unnecessary data duplication (e.g., packet duplication) to reduce, for example, resource waste and interference in the network, which is also desirable from a reliability perspective. For instance, "blind" usage of the available legs for packet duplication (e.g., without considering the consequences) for transmitting multiple copies of packet(s) at a time may even reduce the achieved reliability in a loaded network. Therefore, mechanisms/procedures that can manage/provide/allow/control the usage of the multi connectivity legs, with or without duplication, in a smart and efficient way are desired/needed.

In addition, such a mechanism should minimize the probability of having multiple consecutive packet errors, for example, at an application level, which would result in exceeding of survival time. If the survival time is exceeded, this may trigger an emergency (e.g., recovery) procedure which may have negative consequences, e.g., in terms of increased cost, lost production, etc. (e.g., the factory may have to temporarily suspend production and/or automation). Therefore, such occurrences should be rare. In addition, for URLLC applications with very strict latency requirement (e.g., motion control in factory automation), reactive methods which rely on feedback (over the air, or via non-ideal network interfaces, such as Xn), may not be useful or they can be applied only occasionally and/or for only some of the packets, to avoid the severe consequences described above.

The proposed mechanism includes a method to maximize transmit diversity for consecutive packets (e.g., transmitting consecutive packets across different legs/RF links) to minimize the likelihood of exceeding the survival time. In some implementations, this may be achieved by transmitting consecutive packets using different legs and/or with packet duplication.

For instance, for URLLC applications with very short periodicity (e.g., industrial applications with ~0.5-1 ms periodicity), there may not be enough time for the radio channel to improve or react to packet errors with corrective actions before the next packet arrives. Therefore, packet errors within each leg may have a high correlation leading to exceeding of application survival time if packets are transmitted only via a single leg. The errors across different legs, however, may have lower correlation (e.g., compared to the errors within a single leg), and therefore, in some implementations, usage of multiple legs within survival time can offer reliability benefits. Furthermore, in some implementations, if errors within individual legs are highly correlated, transmitting subsequent packets over different subsets of legs (i.e., applying leg switching) may achieve similar reliability than transmitting over all legs, but with less overhead. The lower overhead reduces scheduling delays and interference, and therefore can offer further reliability improvements especially when the network load is high.

Carrier Aggregation (CA) was introduced to LTE in 3GPP Release 10 using LTE signalling framework available at that time and no major changes were made to the LTE signalling framework to support CA in Release 10. For instance, no major changes were made regarding how the network would configure a carrier to be measured for potential secondary cell (SCell) configuration and/or a carrier to be used for mobility.

In 5G/NR, a similar approach is being used from the first release (e.g., Rel-15) onwards and there is no distinction between carrier types (e.g., types of carriers). In radio resource control (RRC) connected mode, SCells are generally used for offloading while the PCell handles mobility, and no distinction is being made (e.g., by the UE) between a mobility carrier and an offloading carrier. Moreover, a UE is not aware of the reasons a carrier is being measured and the carriers being discussed herein are generally carriers configured in measurement configuration and not serving carriers. A mobility carrier may be defined as a carrier used for mobility purposes, e.g., cell reselection, handover, etc. At least some of such carriers would typically have continuous coverage but not all such carriers need to have the same coverage—the network may also have a mix of carriers in different geographical areas, e.g., due to spectrum usage restrictions such as carriers with requirements for co-existence towards other technologies (e.g., radar frequency avoidance) or at country borders. An offloading carrier may be defined as a carrier used to improve performance (e.g., data throughput) by offloading data transmissions to an offloading carrier. Such a carrier may have coverage limited to certain hot spots. The lack of distinction between carrier types may result in inefficiencies as a UE may perform measurements on all carriers configured at the UE even though the UE does not need to perform at least some measurements on some of the carriers. This may increase SCell setup time.

An offloading carrier may also be defined as a carrier which the UE configured (using dedicated or broadcast signaling) to measure during idle and/or inactive modes/states with the purpose of reporting those measurements once UE transitions back to connected mode. These idle/inactive mode measurements can be used for CA/DC/MR-DC and alike activation and configuration (or for fast SCell set-up and configuration and activation).

In addition, for a UE in radio resource control (RRC) connected mode, 5G/NR introduces a new set of challenges as searchers and measurement occasions have to be shared between all the carriers configured at a UE. For instance, if a UE is configured with carriers for measurements similar to LTE, a UE may not have knowledge regarding whether a carrier is a mobility carrier (e.g., for mobility purposes) or an offloading carrier (e.g., for offloading purposes). This may result in inefficiencies as well in the way measurements are performed at the UE and/or imbalance between mobility and offloading measurements.

Therefore, there is a need/desire for a system/mechanism with improved efficiency and performance in terms of performing UE measurements, for example, for different purposes (e.g., mobility, offloading etc.) based on system needs.

The present disclosure applies to carrier aggregation, dual connectivity or any form of multi-RAT dual connectivity/multi connectivity, or any other form of carrier/bandwidth part aggregation. For example, the dual connectivity could be between NR and NR, and multi-connectivity could be between LTE, NR and WLAN, or between NR, NR, and NR (e.g., between three different NR carriers).

In one example implementation, the method may include receiving, by a user equipment (UE), carrier configuration information and carrier type information from a network node, the carrier type information including an indication whether a carrier is an offloading carrier; determining, by the user equipment (UE), whether one or more offloading conditions to perform offloading measurements are satisfied; and performing, by the user equipment (UE), the offloading measurements in response to determining that the one or more offloading conditions are satisfied, the offloading measurements performed on the carrier when the carrier is an offloading carrier. The method may further include performing, by the user equipment (UE), mobility measurements based on the received carrier configuration information and carrier type information.

In an additional example implementation, the method may include transmitting, by a network node, carrier configuration information and carrier type information to a user equipment (UE); and receiving, by the network node, offloading and/or mobility measurements from the user equipment (UE), the off-loading and/or mobility measurements generated at the user equipment (UE) based on the carrier configuration information and carrier type. Thus, a UE may use the available resources (e.g., measurement occasions, searchers etc.) to perform the measurements based on carrier types and reduce the time the UE takes to perform the measurements.

Additional example implementations are described herein.

Figure 2:
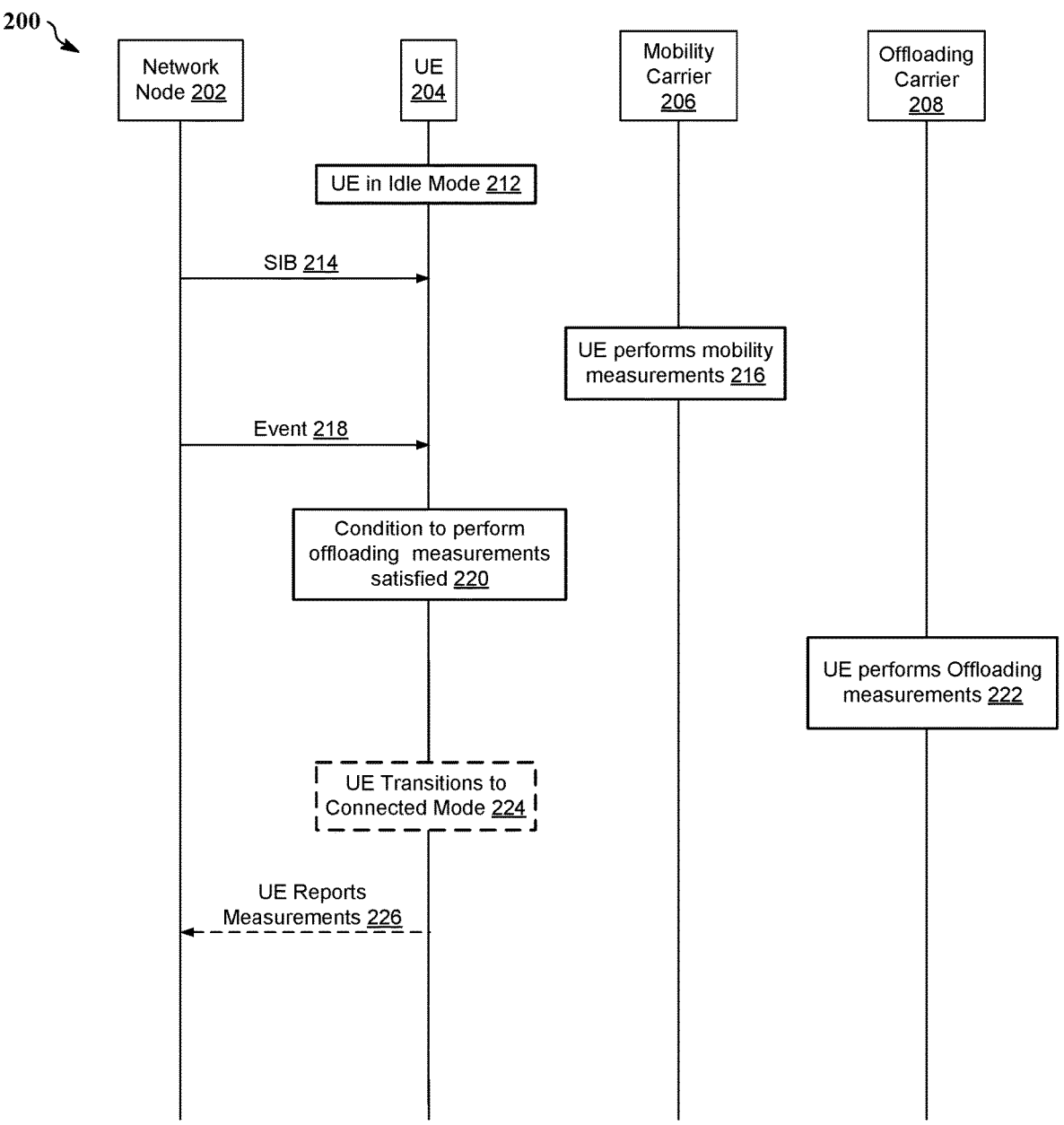
FIG. 2 is a flow diagram illustrating carrier configuration and reference signal measurements at a user equipment, according to an example implementation.

FIG. 2 is a flow diagram illustrating carrier configuration and reference signal measurements at a user equipment, according to an example implementation. In the example implementation, the UE may be in a radio resource control (RRC) idle mode.

As shown in FIG. 2, a network node 202 may be the serving cell for UE 204. In some implementations, for example, UE 204 may be configured with two carriers 206 and 208. In an example implementation, carrier 206 may be configured as a mobility carrier and carrier 208 may be configured as an offloading carrier. Although FIG. 2 illustrates UE 204 configured with two carriers, UE 204 may be configured with more than two carriers. In addition, configuration of more than two types of carriers may be allowed.

At 212, UE 204 may be in a radio resource control (RRC) idle mode. In the idle mode, UE 204 may perform various procedures, for example, cell selection and reselection, tracing area registration, receiving master information block (MIB) and system information blocks (SIBs), etc.

At 214, when UE 204 is in idle mode, UE 204 may receive system information blocks (SIBs) transmitted (e.g., broadcasted) from network node 202. In some implementations, the SIBs may be one or more types of SIBs (e.g., SIB5) that may already exist in 4G/LTE and are broadcasted from network node 202. In some implementations, the SIBs may be a new type of SIB introduced (or to be introduced) in 5G/NR.

The SIBs broadcasted from network node 202 may convey carrier configuration information and carrier type information to the UEs. For example, the carrier configuration information may convey (e.g., include) carrier frequencies, center frequencies, cell bandwidths, and resources to be used by the UE (e.g., UE 204) for performing reference signal (e.g., mobility and/or offloading) measurements associated with the configured carriers (e.g., carriers 206 and/or 208). In some implementations, for example, the carrier type information may convey/include an indication regarding whether a carrier is a mobility carrier, an offloading carrier, or a combination thereof (e.g., mobility+offloading carrier). In some implementations, network node 202 may broadcast SIBs to UE 204.

In an example implementation, a new SIB may be added for enabling configuration of carriers which are to be measured for the purpose of early measurement reporting (or offloading purpose). In some implementations, for example, the indication may also be in the form of a priority value, indicating how often UE would be requested to perform the measurements for the purpose of early measurement reporting (e.g., for the case where the measurements are only performed for early reporting/offloading carriers and not for mobility). In one example implementation, one option is to enable indicating to a UE in connected mode, carriers which are to be measured for another purpose than mobility. One such purpose is measurements for offloading.

In some implementations, additional indication may be added to the existing measurement (reporting) configuration IE for connected mode measurements. Such indication may inform the UE about the measurement purpose of a given carrier, for example, measurements for offloading (e.g., not for mobility but for SCell setup purposes), measurements for mobility and offloading (this may be simple combination or union of the two configurations). In some implementations, the indication may also include a priority value to be used for the measurements, e.g., allowing UE to relax or expedite either the offloading or mobility measurements by a factor to reduce the measurement load (when relaxing the measurements) or to increase the measurement accuracy (when expediting the measurements).

In some implementations, for example, the UE may be indicated via SIBx that the network supports the above functionality and UE would then store idle/inactive mode measurement for later reporting.

In some implementations, these carriers indicated as being used for non-mobility purposes would not be measured (or need to be measured by the specification requirements) with the same periodicity as is done currently for mobility carriers. Only when needed—for example at connection setup (from idle or inactive mode) or when requested in connected mode—the UE would be required to perform the measurements on the non-mobility carriers in accordance with the purpose—e.g., perform measurements on the carriers used for offloading, optionally also according to some indicated periodicity that overrides the default measurement period. In addition, in some implementations, for example, the UE may be enabled to report the mobility measurements UE performed during idle/inactive mode. These measurements may be additional to the offloading carrier measurements reported by UE once back in connected mode (for example upon connection establishment), e.g., enable UE to report measurements from idle/inactive mode in connected even if not included into the connected mode measurement configuration.

At 216, UE 204 may perform mobility measurements on carrier 206 based on the indicated carrier type (e.g., mobility). In some implementations, the offloading measurements may include reference signal received power (RSRP) measurements, reference signal received quality (RSRQ), reference signal strength indicator (RSSI) measurements, reference signal-signal to interference and noise ratio (RS-SINR) measurements, or any reference signal (RS) measurements. As UE 204 is in idle mode, in some implementations, UE 204 may store the mobility measurements collected by the UE. UE may determine whether to store (e.g., indicated by network node 202 via a radio resource control (RRC) connection release or connection suspend message) the mobility measurements (collected when the UE is in idle mode) based on the carrier configuration information received from network node 202. This will provide for an opportunity for UE 204 to transmit the mobility measurements collected when the UE is in an idle mode, to the network node 202, once UE 204 transitions to a RRC connected mode. In such an implementation, UE 204 may store the mobility measurements collected when the UE is an idle mode and transmit/report the stored/collected mobility measurements when the UE transitions to the connected mode. For example, once UE 204 transitions to connected mode, the UE may send the measurements to the network node, based on which network node can more reliably configure the UE with the appropriate small cell/SCell or offloading carriers. This would speed up the process of CA/DC/MR-DC and other such configurations and activations and therefore ensures a fast and successful offloading for UE.

Although, a UE may perform measurements on a carrier according to indicated carrier type, in some implementations, for example, the mobility measurements may be always performed on the carrier irrespective carrier type in case the carrier is listed in the list of carriers used for mobility/reselection, e.g., in SIBs. In other words, in some implementations, for example, UE 204 may perform mobility measurements on carrier 208 even though carrier 208 is configured for offloading measurements.

At 218, an event related to offloading measurements may be triggered (or initiated) at UE 204. Such an event may be referred to as an offloading condition. In some implementations, for example, event 218 may be initiating of data transmission by network node 202 or UE 204, serving cell Rx level exceeding a threshold value, etc.

At 220, when UE 204 determines that one or more conditions to perform offloading measurements are satisfied, UE 204 may perform offloading measurements at 222 on offloading carrier 208. In some implementations, for example, the offloading measurements may include reference signal received power (RSRP) measurements, reference signal received quality (RSRQ), reference signal strength indicator (RSSI) measurements, or any reference signal (RS) measurements. The RS signals may also be transmitted as part of synchronization signals, e.g., as done in NR whereas the Synchronization Signal Block (SSB) that contains both the primary/second synchronization signals (PSS/SSS) and PBCH channel carrying the MIB, and the measurements are done based on the received SSB.

As described above at 212, UE 204 may be in idle mode. However, at 224, UE 204 may transition to RRC connected mode. Once UE 204 transitions to connected mode, UE may transmit (e.g., report) the mobility measurements collected when the UE was in the idle mode to network node, for example containing reference signal received power (RSRP) measurements, reference signal received quality (RSRQ), reference signal strength indicator (RSSI) measurements, reference signal-signal to interference and noise ratio (RS-SINR) or any other measurements done based on reference signals (RS). At 226, UE 204 may optionally transmit offloading and/or mobility measurements to network node 202.

Figure 3:
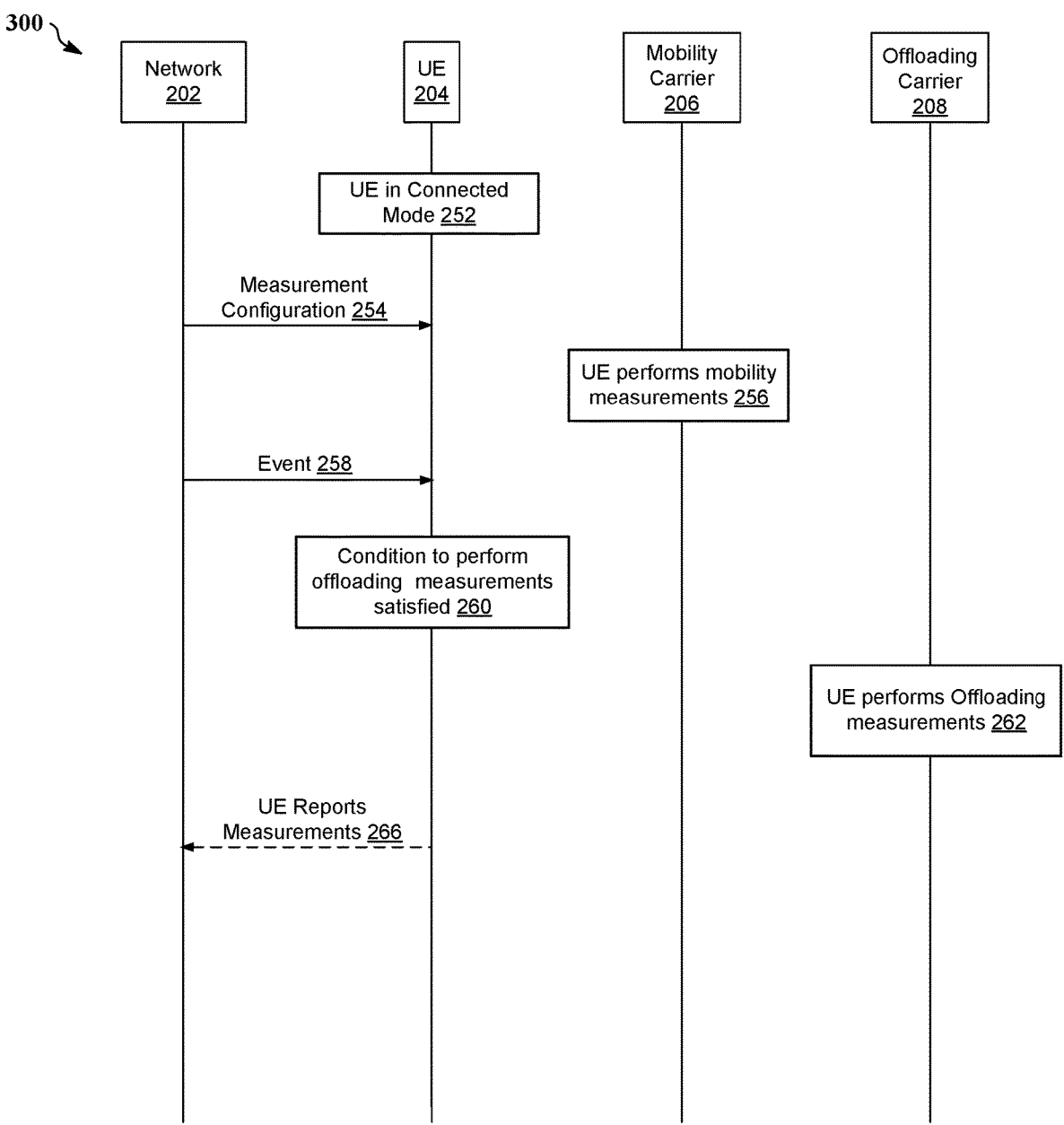
FIG. 3 is a flow diagram illustrating carrier configuration and reference signal measurements at a user equipment, according to an additional example implementation.

FIG. 3 is a flow diagram illustrating carrier configuration and reference signal measurements at a user equipment, according to an example implementation. In the example implementation, the UE may be in RRC connected mode.

At 252, UE 204 may be in a radio resource control (RRC) connected mode. In the connected mode, UE 204 can transmit/receive data to/from network node 202.

At 254, when UE 204 is in the connected mode, UE 204 may receive measurement configuration information element (IE) from network node 202. In some implementations, the measurement configuration IE may convey carrier configuration information and carrier type information to the UEs. For example, the carrier configuration information may convey (e.g., include) carrier frequencies, center frequencies, cell bandwidths, and resources to be used by the UE (e.g., UE 204) for performing mobility and/or offloading measurements associated with the configured carriers (e.g., carriers 206 and/or 208). In some implementations, for example, the carrier type information may convey/include an indication regarding whether a carrier is a mobility carrier, an offloading carrier, or a combination thereof (e.g., mobility+offloading carrier).

In some implementations, for example, the operations at 256, 258, 260, and 262, and 266 of FIG. 3 may be same/substantively same or similar/substantively similar to operations 216, 218, 220, 222, and 226 of FIG. 2. Since UE 204 is already in the connected mode, UE 204 may, optionally, transmit/report measurements to network node 202.

FIGS. 2 and 3 illustrate configuring carriers and performing mobility and/or offloading measurements based on carrier type defined by the network node and configured by the UE. This provides for faster search and/or using less battery power and thereby saves power.

FIG. 4 is a flow chart 400 illustrating carrier configuration and reference signal measurements at a user equipment (UE), for example, UE 204, according to at least one example implementation.

At block 410, a UE (e.g., UE 204) may receive carrier configuration information and carrier type information from a network node. In an example implementation, UE 204 may receive carrier configuration information and carrier type information from network node 202.

In some implementations, as described above in reference to FIGS. 2 and 3, the carrier configuration information received from network node 202 may include (e.g., identify, indicate, etc.) carrier frequencies, center frequencies, cell bandwidths, and/or resources to be used by the UE for performing reference signal measurements (e.g., offloading measurements). In some implementations, as described above in reference to FIGS. 2 and 3, the carrier type information may include an indication which indicates (or may indicate) whether a carrier is a mobility carrier, offloading carrier, or both. In an example implementation, the carrier type information may include an indication which indicates that carrier 208 is an offloading carrier. In some implementations, for example, if network node 202 does not indicate that a carrier is an offloading carrier, UE 204 may assume that the carrier is not an offloading carrier and that the carrier is a mobility carrier. In an example implementation, for example, UE 204 may receive information (e.g., carrier configuration and carrier type information) from network node 202 to configure carriers 206 and 208 and configure carrier 206 as a mobility carrier and carrier 208 as an offloading carrier.

At block 420, the UE may determine whether one or more offloading conditions to perform offloading measurements are satisfied. In some implementations, for example, UE 204 may determine whether the one or more offloading conditions are satisfied (e.g., initiating an event 218). As described above in reference to FIGS. 2 and 3, an example of such an event (or trigger) may be initiating of data transmission by network node 202 and/or UE 204. Another example of such an event may be determining that serving cell Rx level (e.g., RSRP, RSRQ, RSSI, RS-SINR, etc.) exceeds a threshold value.

At block 430, the UE may perform the offloading measurements in response to determining that the one or more offloading conditions are satisfied. In some implementations, for example, when UE 204 determines that the one or more offloading conditions have been satisfied (e.g., network node 202/UE 204 initiating data transmissions), UE 204 may perform the offloading measurements.

In some implementations, UE 204 may perform offloading measurements, for example, based on the carrier configuration information and carrier type information (e.g., received at 410). For example, UE 204 may perform offloading measurements on carrier 208 as carrier 208 is configured as an offloading carrier. When UE 204 performs offloading measurements on carrier 208, UE 204 does not have to perform offloading measurements on carrier 206 as carrier 206 is not configured as an offloading carrier. This provides for a faster search (e.g., initiation and/or activation related to SCell) as UE 204 may be able to use the available measurement occasions to perform offloading measurements instead of splitting the measurement occasions between carriers 206 and 208.

In some implementations, however, UE 204 may perform mobility measurements on carriers 206 and 208 based on the received information from network node 202. Although UE 204 may perform offloading measurements when the offloading conditions are met, UE 204 may also perform mobility measurements based on whether the mobility carrier is configured.

As described above, in reference to FIGS. 2 and 3, the mobility and offloading measurements may include reference signal received power (RSRP) measurements, reference signal received quality (RSRQ), reference signal strength indicator (RSSI) measurements, reference signal-signal to interference and noise ratio (RS-SINR), or other reference signal measurements.

In some implementations, as described above in reference to FIG. 2, UE 204 may be an idle mode. In such conditions, UE 204 may perform mobility measurements on the carriers configured at the UE. However, in some implementations, UE 204 may store the mobility measurements collected when the UE is in the idle mode based on the information received from the network node, for instance, as part of the carrier configuration information.

In response to transitioning to a connected mode, UE 204 may transmit (optionally) the stored mobility measurements to the network node. Whether the UE stores and/or transmits the mobility measurements to the network node depends on the carrier configuration information received from network node and used by UE 204 for configuring the UE.

FIG. 5 is a flow chart 500 illustrating carrier configuration and receiving reference signal measurements at a network node, for example, network node 202, according to at least one example implementation.

At block 510, a network node (e.g., network node 202) may transmit carrier configuration information and carrier type information to a user equipment. In some implementations, for example, network node 202 may transmit carrier configuration information and carrier type information to UE 204. The carrier configuration information may indicate the frequencies of carriers 206 and 208 (e.g., F1 and F2) and the carrier type information may indicate that carrier 206 is a mobility carrier and carrier 208 is an offloading carrier.

At block 520, the network node (e.g., network node 202) may receive the offloading and/or mobility measurements from the UE (e.g., UE 204). It should be noted that the offloading and/or mobility measurements received at network node 202 are generated at UE 204 based on the carrier configuration information and carrier type information sent to UE 204 from network node 202.

In some implementations, for example, the carrier type information may include an indication regarding whether a carrier is a mobility carrier, an offloading carrier, or a combination thereof. For instance, the carrier type information may indicate carrier 206 as a mobility carrier and carrier 208 as an offloading carrier.

In some implementations, for example, wherein the indication further includes a priority value associated with performing the mobility and/or offloading measurements, the priority value further indicating whether the performing of the mobility and/or offloading measurements is to be skipped, relaxed or expedited.

In some implementations, for example, the carrier configuration information and carrier type information are broadcasted via a system information block (SIB) to the user equipment (UE) when the user equipment (UE) is in a radio resource control (RRC) idle mode.

In some implementations, for example, the SIB is an existing SIB or a new SIB. In some implementations, for example, the carrier configuration information and carrier type information are transmitted to the user equipment (UE) via a measurement configuration information element (IE) when the user equipment (UE) is in a radio resource control (RRC) connected mode.

In some implementations, if UE 204 is enabled to report mobility measurements collected in connected mode in addition to offloading idle/inactive mode measurements, network node 202 may have a more accurate measurements used for activating a candidate SCell.

In some implementations, the UE may indicate when reporting idle/inactive mode measurements upon RRC connection setup/resume whether those measurements were performed for mobility purposes or for offloading purposes (e.g., as it implies different requirements and thus different accuracy/reliability). The indication may also be per carrier or per reported cell. The motivation here is that in some cases the network may not be aware of how the UE measured a particular carrier or cell. For example, the UE may be allowed to stop measuring carriers for mobility purposes if the serving cell is good enough. In such a case, the UE may still measure carriers for offloading purposes if the carrier is configured for both purposes (e.g., mobility and offloading carrier). However, as the measurements are not reported during the idle/inactive mode, the network would not know whether the measurements were performed for mobility or offloading purposes.

In some implementations, the UE may indicate when reporting idle/inactive mode measurements upon RRC connection setup/resume whether those measurements were not performed at all (e.g., UE skipped measurements), performed with relaxed requirements (e.g., measurements with reduced accuracy and/or reliability), performed with normal requirements (e.g., measurements with accuracy and/or reliability specified for mobility and/or reliability specified for mobility or cell reselection measurements), or performed with expedited requirements (e.g., UE perform the measurements more frequently than specified for mobility or cell reselection measurements). In some implementations, for example, a) in idle mode a new SIB may be introduced to contain carriers specifically for the purpose of early reporting; b) a new information element (IE) may be introduced in connected mode to enable network to signal UE which carriers are to be measured for the purpose of offloading (i.e., not intended for mobility); c) alternative for both idle/inactive and/or connected mode, a new indicator could be added for each measurement (reporting or object) configuration. This indicator would inform the UE whether the measurement object (carrier) purpose is mobility or offloading, or both.

In the above example implementations, the network may also additionally indicate a periodicity for the offloading measurements to differentiate how often UE is expected to measure them, which would be then done according to different requirements than for legacy (mobility) measurements. Additionally, there may be a need to have aligned UE requirements to ensure network visibility of the expected measurement latency on UE side under the given configurations.

In some implementations, mobility carriers (e.g., carriers configured for mobility measurements) may follow the existing measurement requirements currently defined. However, measurement requirements for carriers that are configured for offloading (offloading carriers) or early reporting purpose, would not necessarily need to follow same requirements, but may be allowed a more relaxed (or even more stringent) performance, depending on network indication on desired measurement periodicity.

In some implementations, once the connection setup is started the UE may measure the carriers indicated for offloading. These carriers would not need to be measured in a continuous manner. In a similar manner, the UE in connected mode would only measure carriers indicated as offloading carriers, once requested by the network.

In some implementations, a UE capable of per-FR measurements and having the serving cell in FR1, may only start to measure FR2 carrier/objects/cells indicated as being offloading carriers once needed, for example, once the connection setup starts (e.g., idle mode) or when requested by network (e.g., in connected mode).

Additional example implementations are described herein.

Example 1. A method of communications, comprising: receiving, by a user equipment (UE), carrier configuration information and carrier type information from a network node, the carrier type information including an indication whether a carrier is an offloading carrier; determining, by the user equipment (UE), whether one or more offloading conditions to perform offloading measurements are satisfied; and performing, by the user equipment (UE), the offloading measurements in response to determining that the one or more offloading conditions are satisfied, the offloading measurements performed on the carrier when the carrier is an offloading carrier.

Example 2. The method of Example 1, further comprising: performing, by the user equipment (UE), mobility measurements based on the received carrier configuration information and carrier type information.

Example 3. The method of any of Examples 1-2, wherein the offloading and mobility measurements include reference signal received power (RSRP) measurements, reference signal received quality (RSRQ), reference signal strength indicator (RSSI) measurements, reference signal-signal to interference and noise ratio (RS-SINR) or other reference signal (RS) measurements.

Example 4. The method of any of Examples 1-3, wherein the one or more offloading conditions include: initiating of data transmission by the user equipment or the network node; and/or serving cell Rx level exceeding a threshold value.

Example 5. The method of any of Examples 1-4, wherein the user equipment (UE) is in a radio resource control (RRC) idle mode, and further comprising: detecting that the user equipment (UE) transitioned from the radio resource control (RRC) idle mode to a radio resource control (RRC) connected mode; determining that the user equipment (UE) is configured to transmit the mobility measurements that are collected when the user equipment (UE) is in the radio resource control (RRC) idle mode to the network node when the user equipment (UE) transitions to the radio resource control (RRC) connected mode; and transmitting, by the user equipment (UE), the mobility measurements collected when the user equipment (UE) is in the radio resource control (RRC) idle node to the network node in response to the detecting that the user equipment (UE) transitioned to the radio resource control (RRC) connected mode.

Example 6. The method of any of Examples 1-5, wherein the user equipment (UE) transitions from the radio resource control (RRC) idle mode to the radio resource control (RRC) connected mode in response to the one or more offloading conditions being satisfied.

Example 7. The method of any of Examples 1-6, wherein the carrier configuration information and carrier type information are broadcasted to the user equipment (UE) by the network node via a system information block (SIB) when the user equipment (UE) is in the radio resource control (RRC) idle mode.

Example 8. The method of any of Examples 1-7, wherein the SIB is an existing SIB or a new SIB.

Example 9. The method of any of Examples 1-8, wherein the user equipment (UE) is in a radio resource control (RRC) connected mode, and further comprising: transmitting, by the user equipment (UE), the offloading and/or mobility measurements to the network node.

Example 10. The method of any of Examples 1-9, wherein the user equipment (UE) is in a radio resource control (RRC) connected mode, and wherein the carrier configuration information and carrier type information are received by the user equipment (UE) via a measurement configuration information element (IE) from the network node.

Example 11. The method of any of Examples 1-10, wherein the carrier type information includes an indication regarding whether a carrier is a mobility carrier, an offloading carrier, or a combination thereof.

Example 12. The method of any of Examples 1-11, wherein the indication includes a priority value associated with performing the mobility and/or offloading measurements, the priority value further indicating whether the performing of the mobility and/or offloading measurements is to be stopped, relaxed or expedited.

Example 13. The method of any of Examples 1-12, wherein the carrier configuration information provides information regarding carrier frequencies, center frequencies, cell bandwidths, and/or resources to be used by the user equipment (UE) for performing the offloading and/or mobility measurements.

Example 14. A method of communications, comprising: transmitting, by a network node, carrier configuration information and carrier type information to a user equipment (UE); and receiving, by the network node, offloading and/or mobility measurements from the user equipment (UE), the off-loading and/or mobility measurements generated at the user equipment (UE) based on the carrier configuration information and carrier type.

Example 15. The method of Example 14, wherein the carrier type information includes an indication regarding whether a carrier is a mobility carrier, an offloading carrier, or a combination thereof.

Example 16. The method of any of Examples 14-15, wherein the indication further includes a priority associated with performing the mobility and/or offloading measurements, the priority further indicating whether the performing of the mobility and/or offloading measurements is to be stopped, relaxed, or expedited.

Example 17. The method of any of Examples 14-16, wherein the carrier configuration information and carrier type information are broadcasted via a system information block (SIB) to the user equipment (UE) when the user equipment (UE) is in a radio resource control (RRC) idle mode.

Example 18. The method of any of Examples 14-17, wherein the SIB is an existing SIB or a new SIB.

Example 19. The method of any of Examples 14-18, wherein the carrier configuration information and carrier type information are transmitted to the user equipment (UE) via a measurement configuration information element (IE) when the user equipment (UE) is in a radio resource control (RRC) connected mode.

Example 20. An apparatus comprising at least one processor and at least one memory including computer instructions, when executed by the at least one processor, cause the apparatus to perform a method of any of Examples 1-13.

Example 21. An apparatus comprising means for performing a method of any of Examples 1-13.

Example 22. A non-transitory computer-readable storage medium having stored thereon computer executable program code which, when executed on a computer system, causes the computer system to perform the steps of any of Examples 1-13.

Example 23. An apparatus comprising at least one processor and at least one memory including computer instructions, when executed by the at least one processor, cause the apparatus to perform a method of any of Examples 14-19.

Example 24. An apparatus comprising means for performing a method of any of Examples 14-19.

Example 25. A non-transitory computer-readable storage medium having stored thereon computer executable program code which, when executed on a computer system, causes the computer system to perform the steps of any of Examples 14-19.

Figure 6:
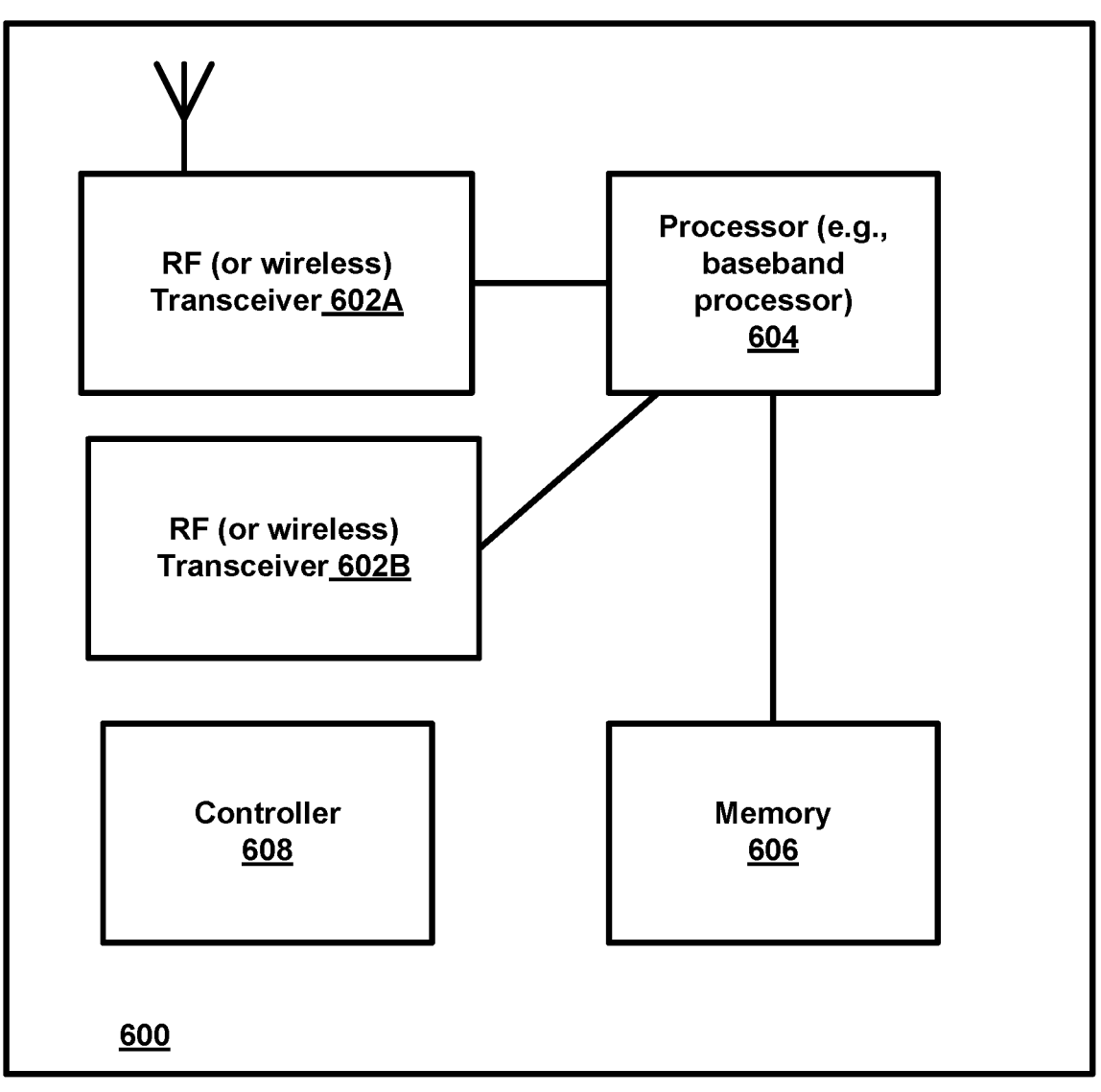
FIG. 6 is a block diagram of a node or wireless station (e.g., base station/access point or mobile station/user device/UE), according to an example implementation.

FIG. 6 is a block diagram of a wireless station (e.g., user equipment (UE)/user device or AP/gNB/MgNB/SgNB) 600 according to an example implementation. The wireless station 600 may include, for example, one or more RF (radio frequency) or wireless transceivers 602A, 602B, where each wireless transceiver includes a transmitter to transmit signals and a receiver to receive signals. The wireless station also includes a processor or control unit/entity (controller) 604/

608 to execute instructions or software and control transmission and receptions of signals, and a memory 606 to store data and/or instructions.

Processor 604 may also make decisions or determinations, generate frames, packets or messages for transmission, decode received frames or messages for further processing, and other tasks or functions described herein. Processor 604, which may be a baseband processor, for example, may generate messages, packets, frames or other signals for transmission via wireless transceiver 602 (602A or 602B). Processor 604 may control transmission of signals or messages over a wireless network, and may control the reception of signals or messages, etc., via a wireless network (e.g., after being down-converted by wireless transceiver 602, for example). Processor 604 may be programmable and capable of executing software or other instructions stored in memory or on other computer media to perform the various tasks and functions described above, such as one or more of the tasks or methods described above. Processor 604 may be (or may include), for example, hardware, programmable logic, a programmable processor that executes software or firmware, and/or any combination of these. Using other terminology, processor 604 and transceiver 602 together may be considered as a wireless transmitter/receiver system, for example.

In addition, referring to FIG. 6, a controller (or processor) 608 may execute software and instructions, and may provide overall control for the station 600, and may provide control for other systems not shown in FIG. 6, such as controlling input/output devices (e.g., display, keypad), and/or may execute software for one or more applications that may be provided on wireless station 600, such as, for example, an email program, audio/video applications, a word processor, a Voice over IP application, or other application or software. Moreover, a storage medium may be provided that includes stored instructions, which when executed by a controller or processor may result in the processor 604, or other controller or processor, performing one or more of the functions or tasks described above.

According to another example implementation, RF or wireless transceiver(s) 602A/602B may receive signals or data and/or transmit or send signals or data. Processor 604 (and possibly transceivers 602A/602B) may control the RF or wireless transceiver 602A or 602B to receive, send, broadcast or transmit signals or data.

The aspects are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer, chip or chipset. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

What is claimed is:

1. A method of communications, comprising:
receiving, by a user equipment (UE), configuration information of one or more measurements to be performed by the UE for an offloading carrier while in a radio resource control (RRC) idle mode or a RRC inactive mode, wherein the offloading carrier is a carrier configured to be measured while the UE is in the RRC idle mode or the RRC inactive mode, and wherein the one or more measurements are to be performed when one or more conditions to perform the one or more measurements are satisfied, and to be reported after transitioning to a RRC connected mode;
determining, by the UE, that the one or more conditions to perform the one or more measurements are satisfied, the one or more conditions comprising a serving cell received signal (Rx) level exceeding a threshold value; and
in response to determining that the one or more conditions are satisfied, including the serving cell received signal (Rx) level exceeding the threshold value, performing the one or more measurements of the offloading carrier while in the RRC idle mode or the RRC inactive mode.

2. The method of claim 1, further comprising:
receiving, by the UE, carrier type information including an indication whether the carrier is a mobility carrier, an offloading carrier, or a combination thereof.

3. The method of claim 1, wherein the one or more measurements include reference signal received power (RSRP) measurements, reference signal received quality (RSRQ), reference signal strength indicator (RSSI) measurements, reference signal-signal to interference and noise ratio (RS-SINR).

4. The method of claim 1, wherein the one or more conditions further comprise:
initiating of data transmission by the user equipment or a network node.

5. The method of claim 2, wherein the UE is in the RRC idle mode and the carrier type information includes an indication that the carrier is a mobility carrier, and further comprising:

performing, by the UE, mobility measurements based on the configuration information and the carrier type information;

detecting that the UE transitioned from the RRC idle mode to the RRC connected mode;

determining that the UE is configured to transmit the mobility measurements that are collected when the UE is in the RRC idle mode, to a network node when the UE transitions to the RRC connected mode; and transmitting, by the UE, the mobility measurements collected when the UE is in the RRC idle node to the network node in response to the detecting that the UE transitioned to the RRC connected mode.

6. The method of claim 2, wherein the configuration information and the carrier type information are broadcasted to the UE by the network node via a system information block (SIB) when the UE is in the RRC idle mode.

7. The method of claim 6, wherein the SIB is an existing SIB or a new SIB.

8. The method of claim 1, wherein the UE is in a RRC connected mode, and further comprising:

transmitting, by the UE, at least one of the measurements of the offloading carrier to a network node.

9. The method of claim 2, wherein the UE is in the RRC connected mode, and wherein the configuration information and the carrier type information are received by the UE via a measurement configuration information element (IE) from a network node.

10. The method of claim 1, wherein the configuration information includes a priority value to either relax or expedite the measurements of the offloading carrier.

11. The method of claim 1, wherein the configuration information provides information regarding carrier frequencies, center frequencies, cell bandwidths, and/or resources to be used by the UE for performing the one or more measurements of the offloading carrier or mobility measurements.

12. The method of claim 1, wherein the configuration information indicates how often the one or more measurements of the offloading carrier are to be performed by the UE.

13. An apparatus comprising at least one processor and at least one memory including computer instructions, when executed by the at least one processor, cause the apparatus to perform the method of claim 1.

14. A method of communications, comprising:

transmitting, by a network node, configuration information of one or more measurements to be performed by a user equipment (UE) for an offloading carrier while the UE is in a radio resource control (RRC) idle mode or a RRC inactive mode, wherein the offloading carrier is a carrier configured to be measured while the UE is in the RRC idle mode or the RRC inactive mode, and wherein the one or more measurements are to be performed by the UE when one or more conditions to perform the one or more measurements are satisfied, and to be reported after the UE transitions to a RRC connected mode; and receiving, by the network node from the UE, the one or more measurements performed by the UE in response to the UE determining that one or more conditions are satisfied, the one or more conditions comprising a serving cell received signal (Rx) level at the UE exceeding a threshold value.

15. The method of claim 14, further comprising:

transmitting, to the UE, carrier type information including an indication whether a carrier is a mobility carrier, an offloading carrier, or a combination of thereof.

16. The method of claim 15, wherein the indication further includes a priority value to either relax or expedite the measurements of the offloading carrier.

17. The method of claim 15, wherein the configuration information and the carrier type information are broadcasted via a system information block (SIB) to the UE when the UE is in the RRC idle mode.

18. The method of claim 17, wherein the SIB is an existing SIB or a new SIB.

19. The method of claim 14, wherein the configuration information and the carrier type information are transmitted to the UE via a measurement configuration information element (IE) when the UE is in the RRC connected mode.

* * * * *